United States Patent
Hayakawa

(10) Patent No.: US 8,635,474 B2
(45) Date of Patent: Jan. 21, 2014

(54) IMAGE FORMING APPARATUS

(75) Inventor: Masahiro Hayakawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 279 days.

(21) Appl. No.: 12/908,734

(22) Filed: Oct. 20, 2010

(65) Prior Publication Data

US 2011/0126036 A1 May 26, 2011

(30) Foreign Application Priority Data

Nov. 24, 2009 (JP) ................................ 2009-266489

(51) Int. Cl.
*G06F 1/32* (2006.01)

(52) U.S. Cl.
USPC ............................ 713/320; 713/323; 713/324

(58) Field of Classification Search
USPC ......................................................... 713/323
See application file for complete search history.

(56) References Cited

U.S. PATENT DOCUMENTS

| | | | | |
|---|---|---|---|---|
| 5,504,910 A * | 4/1996 | Wisor et al. | .................... | 713/322 |
| 6,925,574 B2 * | 8/2005 | Satoh | ............................ | 713/323 |
| 6,950,953 B2 | 9/2005 | Kizawa et al. | | |
| 7,516,335 B2 * | 4/2009 | Watanabe | ..................... | 713/300 |
| 7,555,660 B2 * | 6/2009 | Kamisuwa et al. | ........... | 713/300 |
| 7,742,179 B2 * | 6/2010 | Ikeda | ........................... | 358/1.14 |
| 7,755,779 B2 * | 7/2010 | Miura et al. | ................. | 358/1.13 |
| 7,773,236 B2 * | 8/2010 | Yamada | .......................... | 358/1.1 |
| 7,843,953 B2 * | 11/2010 | Kawata et al. | ................ | 370/419 |
| 7,886,170 B2 * | 2/2011 | Komatsu et al. | .............. | 713/323 |
| 7,890,784 B2 * | 2/2011 | Katoh | ............................ | 713/323 |
| 7,894,085 B2 * | 2/2011 | Maeda | ......................... | 358/1.13 |
| 7,971,079 B2 * | 6/2011 | Ezura | ............................ | 713/320 |
| 7,992,019 B2 * | 8/2011 | Kawaji | .......................... | 713/320 |
| 8,032,769 B2 * | 10/2011 | Noda et al. | .................... | 713/320 |
| 8,082,461 B2 * | 12/2011 | Ohhashi | ......................... | 713/324 |
| 8,214,676 B2 * | 7/2012 | Katoh | ............................ | 713/324 |
| 8,248,629 B2 * | 8/2012 | Fukuda | ......................... | 358/1.14 |
| 8,261,107 B2 * | 9/2012 | Saito | ............................. | 713/300 |
| 2004/0004732 A1 * | 1/2004 | Takeda et al. | ................ | 358/1.13 |
| 2005/0216776 A1 * | 9/2005 | Watanabe | ..................... | 713/300 |
| 2007/0260753 A1 * | 11/2007 | Komatsu et al. | .................. | 710/1 |
| 2007/0280512 A1 * | 12/2007 | Yamada | ........................ | 382/120 |
| 2008/0133950 A1 * | 6/2008 | Kawaji | .......................... | 713/320 |

(Continued)

FOREIGN PATENT DOCUMENTS

| | | |
|---|---|---|
| CN | 1480820 A | 3/2004 |
| EP | 1378859 A2 | 1/2004 |
| JP | 2000-307784 A | 11/2000 |
| JP | 2005-267099 A | 9/2005 |

*Primary Examiner* — Ryan Stiglic

(74) *Attorney, Agent, or Firm* — Canon USA Inc. IP Division

(57) ABSTRACT

An image forming apparatus includes a first control unit configured to control an operation of an image forming unit, and a second control unit configured to be capable of communicating with the first control unit and transmitting information associated with forming an image to the first control unit. The image forming apparatus has a normal operation mode in which an image forming operation is performed, a first power-saving operation mode in which an operation of the first control unit is stopped, and a second power-saving operation mode in which supplying of electric power to the second control unit is stopped. In the first power-saving operation mode, the second control unit determines whether to switch into the normal operation mode from the first power-saving operation mode. In the second power-saving operation mode, the first control unit determines whether to switch into the normal operation mode from the second power-saving operation mode.

22 Claims, 18 Drawing Sheets

(56) References Cited

U.S. PATENT DOCUMENTS

| | | | |
|---|---|---|---|
| 2008/0195688 A1* | 8/2008 | Watanabe | 709/201 |
| 2008/0201594 A1* | 8/2008 | Narushima | 713/324 |
| 2009/0119522 A1* | 5/2009 | Satoh | 713/320 |
| 2009/0125739 A1* | 5/2009 | Satoh | 713/322 |
| 2009/0144573 A1* | 6/2009 | Ohhashi | 713/323 |
| 2009/0210732 A1* | 8/2009 | Aoyagi | 713/320 |
| 2009/0259868 A1* | 10/2009 | Katoh | 713/324 |
| 2010/0211809 A1* | 8/2010 | Shimada | 713/323 |
| 2010/0218025 A1* | 8/2010 | Saito | 713/324 |
| 2011/0058206 A1* | 3/2011 | Park et al. | 358/1.14 |
| 2011/0083027 A1* | 4/2011 | Takagi | 713/323 |
| 2011/0113267 A1* | 5/2011 | Park et al. | 713/310 |
| 2011/0173473 A1* | 7/2011 | Cho | 713/323 |
| 2012/0002233 A1* | 1/2012 | Hasegawa | 358/1.14 |

* cited by examiner

IMAGE FORMING APPARATUS

BACKGROUND OF THE INVENTION

1. Field of the Invention

The present invention relates to an image forming apparatus, such as a printer, a copying machine, a facsimile machine, etc., configured to form an image on a recording medium.

2. Description of the Related Art

In recent years, there has been a strong demand for a reduction in power consumption of an image forming apparatus such as a printer, a copying machine, a facsimile machine, etc. In particular, there is a demand for a reduction in power consumption in a waiting state in which no operation is performed. To meet the demand for a reduction in power consumption, many image forming apparatuses have a power-saving operation mode in which electric power is supplied only to units that really need electric power in the waiting state. In a known example of a power-saving operation mode, electric power is supplied only to a control unit including a CPU and supplying of electric power to the other units is stopped.

An example of a power-saving operation mode is described below with reference to FIG. 1. FIG. 1 is a control block diagram illustrating how various control units in the image forming apparatus are connected to each other. As shown in this control block diagram, the image forming apparatus includes an engine control unit 104, a controller 103, and a scanner control unit 102. In accordance with information received from the controller 103, the engine control unit 104 controls a whole image forming unit (hereafter also referred to as the engine unit) in terms of various operations including an operation of feeding, conveying, and ejecting a recording medium, an operation of forming an image on the recording medium, an operation of fixing the image formed on the recording medium, etc. The engine control unit 104 is connected to a power switch 403 used to turn a power supply on or off, a door switch 401 configured to detect opening/closing of a door, and a sensor 402 configured to detect a status of the apparatus.

The controller 103 configured to receive information from a host computer 105 connected to the image forming apparatus, and, in accordance with the received information, control the operation of the engine control unit 104 and the scanner control unit 102 via communication with them. The controller 103 notifies the host computer 105 of the operation status of the image forming unit and the scanner unit 201. In accordance with the information from the controller 103, the scanner control unit 102 controls the operation of the scanner unit 201. The scanner unit 201 connected to the controller 103 functions as a reading apparatus for inputting image information. The scanner unit 201 includes an image sensor configured by combining an optical system to focus light to form an image of a document and a CCD line sensor such that the document image can be read while scanning the CCD line sensor. An automatic document feeder (ADF) 203 serves to automatically feed a document to the scanner unit 201. An operation unit 202 is an operation panel including an operation button and an LCD (or LED). A user is allowed to input data or a command associated with an operation of the scanner unit 201 or the ADF 203 by operating an operation button on the operation panel.

The scanner control unit 102 includes a microprocessor unit (MPU) 102a serving as a control processing unit, the controller 103 includes an MPU 103a serving as a control processing unit, and the engine control unit 104 includes an MPU 104a serving to control the engine. Hereinafter, the MPU 103a in the controller 103 will also be referred to as the controller MPU 103a, and the MPU 104a in the engine control unit 104 will also be referred to as the engine control MPU 104a. The controller MPU 103a transmits and receives information to and from the MPU 102a in the scanner control unit 102 and the engine control MPU 104a by performing bidirectional serial communication.

FIG. 2 illustrates a circuit including the MPUs shown in FIG. 1 and associated circuit elements. If the engine control MPU 104a turns on a switching element 501, electric power is supplied to the scanner control unit 102 (MPU 102a) and the controller 103 (MPU 103a). In a power-saving operation mode, the MPU 104a turns off the switching element 501 to deactivate the scanner control unit 102 (MPU 102a) and the controller 103 (MPU 103a) thereby reducing power consumption. Note that, for example, an FET may be used as the switching element 501.

FIG. 3 illustrates another example of a configuration. The configuration shown in FIG. 3 is different from that shown in FIG. 1 in that the power switch 403 used to turn on/off the power supply, the door switch 401 configured to detect opening/closing of a door, and the sensor 402 configured to detect an access of a user are connected to the controller 103. FIG. 4 illustrates a circuit including the MPUs shown in FIG. 3 and associated circuit elements. In the power-saving operation mode, the controller MPU 103a turns off the switching element 501 thereby cutting off the electric power to the engine control unit 104 (MPU 104a).

Instead of the above-described configuration in which the electric power to the control units is stopped in the power-saving operation mode, the oscillating operation of the MPU may be stopped while maintaining the supplying of electric power to the control unit (control MPU) as disclosed, for example, in Japanese Patent Laid-Open No. 2000-307784.

In the circuit configuration shown in FIG. 2, a reduction in power consumption can be achieved by cutting off the electric power to the scanner control unit 102 and the controller 103 in the power-saving operation mode. However, because the MPUs do not operate in the power-saving operation mode in which no electric power is supplied to the MPUs, it is impossible to control the operation such that in response to a trigger from the host computer 105 or the operation unit 202, the operation mode is returned from the power-saving operation mode into a normal operation mode in which the electric power is turned on for all control units. In the configuration shown in FIG. 2, to switch into the normal operation mode from the power-saving operation mode, it is necessary to turn on either one of the power switch 403, the door switch 401, and the sensor 402. Therefore, in the configuration shown in FIG. 2, a troublesome process is necessary to return into the normal operation mode, which leads to a reduction in usability.

On the other hand, in the circuit configuration shown in FIG. 4, in the power-saving operation mode, the controller MPU 103a controls supplying of electric power such that supplying of electric power is stopped only to the engine control unit 104. This makes it possible to return into the normal operation mode from the power-saving operation mode in response to turning-on of any one of the host computer 105, the operation unit 202, the power switch 403, the door switch 401, and the sensor 402. Thus, compared with the configuration shown in FIG. 2, a less troublesome process is required to return into the normal operation mode and high usability is achieved. However, in the configuration shown in FIG. 4, electric power is supplied to the controller 103 and the scanner control unit 102 in the power-saving operation mode, and thus the amount of reduction in electric power in the power-saving operation mode is not sufficient compared to that achieved in the configuration shown in FIG. 2.

That is, in the above-described control scheme in which electric power is always supplied to a predetermined particular control unit (MPU), and this MPU controls switching of the operation mode (between the normal operation mode and the power-saving operation mode), it is difficult to achieve simultaneously both high usability and low power consumption in the power-saving operation mode.

In the scheme disclosed in Japanese Patent Laid-Open No. 2000-307784 in which the oscillation of the MPU serving to control the engine is stopped in the power-saving operation mode, it is difficult to achieve a sufficient reduction in power consumption in the power-saving operation mode, and it is difficult to achieve simultaneously both high usability and low power consumption in the power-saving operation mode. Furthermore, in the scheme which the oscillation of the MPU serving to control the engine is stopped in the power-saving operation mode as in the scheme disclosed in Japanese Patent Laid-Open No. 2000-307784, when the MPU serving to control the engine is in the state in which the oscillation is stopped, there is a possibility that an erroneous or runaway operation of the MPU is not detected. If such an abnormality occurs in the MPU in the state in which the oscillating operation is stopped, the abnormality can cause electric power to be incorrectly supplied to a device controlled by the engine control unit, which may lead to a failure of the apparatus.

SUMMARY OF THE INVENTION

In view of the above, the present invention provides a technique to achieve both high usability of an image forming apparatus and a reduction in power consumption.

More specifically, in an aspect of the present invention, there is provided an image forming apparatus comprising a first control unit configured to control an operation of an image forming unit, and a second control unit configured to be capable of communicating with the first control unit and transmitting information for forming an image to the first control unit, the image forming apparatus having a normal operation mode in which an image forming operation is performed, a first power-saving operation mode in which an operation of the first control unit is stopped, and a second power-saving operation mode in which supplying of electric power to the second control unit is stopped, the image forming apparatus further comprising a power supply unit configured to supply electric power to the image forming apparatus, a state detection unit configured to detect a state of the image forming unit, and a connection detection unit configured to detect whether an external device is connected to the image forming apparatus, the second control unit being configured such that when the image forming apparatus is in the first power-saving operation mode, the second control unit determines whether the image forming apparatus is to switch into the normal operation mode from the first power-saving operation mode in response to a signal from the power supply unit, a signal from the state detection unit, or a return signal from the second control unit, the first control unit being configured such that when the image forming apparatus is in the second power-saving operation mode, the first control unit determines whether the image forming apparatus is to switch into the normal operation mode from the second power-saving operation mode in response to the signal from the power supply unit or the signal from the state detection unit, the first control unit being configured such that when the image forming apparatus is in the second power-saving operation mode, the first control unit determines whether the image forming apparatus is to switch into the normal operation mode or the first power-saving operation mode from the second power-saving operation mode in response to a signal from the connection detection unit.

In another aspect of the present invention, there is provided an image forming apparatus comprising a first control unit configured to control an operation of an image forming unit, and a second control unit configured to be capable of communicating with the first control unit and transmitting information for forming an image to the first control unit, the image forming apparatus having a normal operation mode in which an image forming operation is performed, a first power-saving operation mode in which an operation of the first control unit is stopped, and a second power-saving operation mode in which supplying of electric power to the second control unit is stopped, the image forming apparatus further comprising a power supply unit configured to supply electric power to the image forming apparatus, a state detection unit configured to detect a state of the image forming unit, and the second control unit being configured such that when the image forming apparatus is in the first power-saving operation mode, the second control unit determines whether the image forming apparatus is to switch into the normal operation mode from the first power-saving operation mode in response to a signal from the power supply unit, a signal from the state detection unit, or a return signal from the second control unit, the first control unit being configured such that when the image forming apparatus is in the second power-saving operation mode, the first control unit determines whether the image forming apparatus is to switch into the normal operation mode from the second power-saving operation mode in response to the signal from the power supply unit or the signal from the state detection unit.

Further features of the present invention will become apparent from the following description of exemplary embodiments with reference to the attached drawings.

DESCRIPTION OF THE EMBODIMENTS

The present invention is described in further detail below with reference to embodiments by way of example but not limitation.

Figure 1:
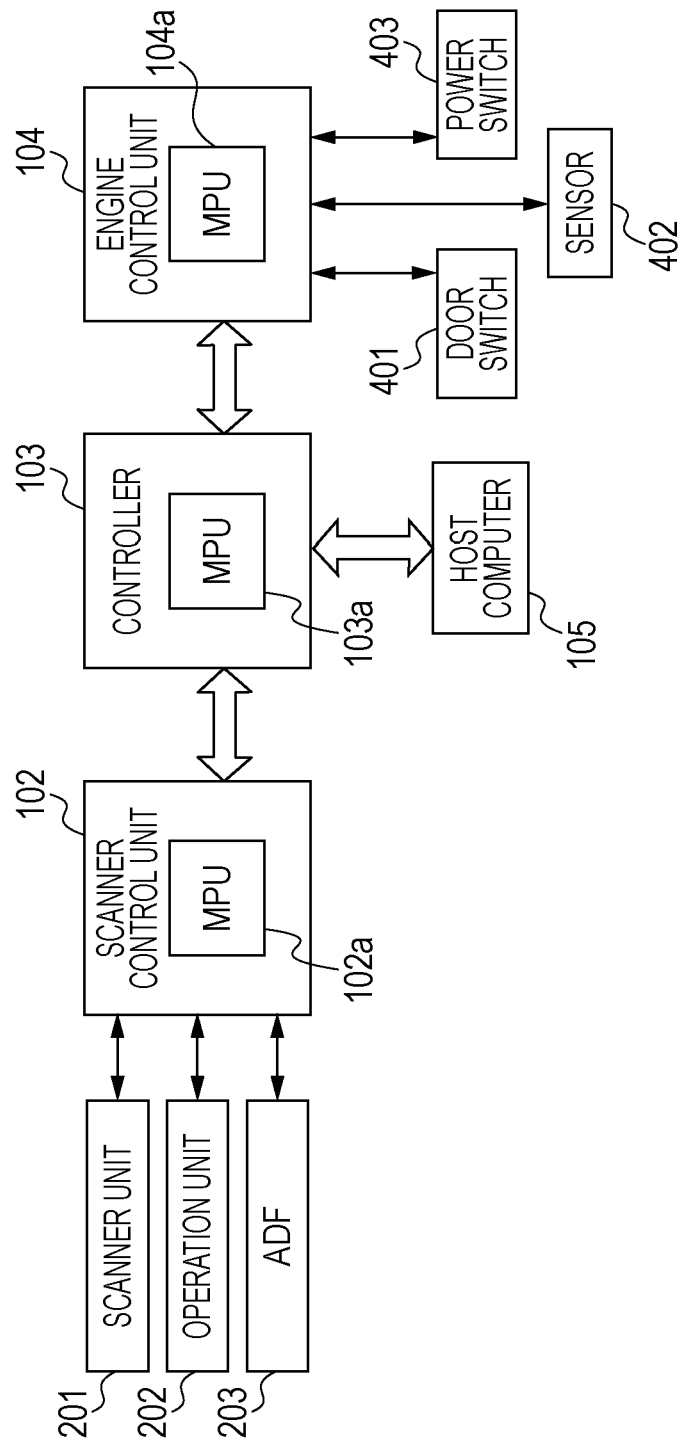
FIG. 1 is a control block diagram illustrating a configuration of an image forming apparatus including a plurality of control units.

According to a first embodiment, control units in an image forming apparatus are configured in a similar manner to that shown in the block diagram of FIG. 1. The image forming apparatus includes an engine control unit 104 serving as a first control unit, a controller 103 serving as a second control unit, and a scanner control unit 102 serving as a third control unit. The scanner control unit 102 controls a scanner unit 201 configured to read a document image, an operation unit 202, and an ADF 203. In accordance with a command from a host computer 105, the controller 103 issues an operation command to the engine control unit 104 or the scanner control unit. The engine control unit 104 controls an operation of the image forming unit. The engine control unit 104 is connected to a door switch 401, a sensor 402, and a power switch 403, serving as state detection units, and detects states of these state detection units. The controller 103, the engine control unit 104, and scanner control unit 102 are capable of performing two-way communication with each other.

Figure 2:
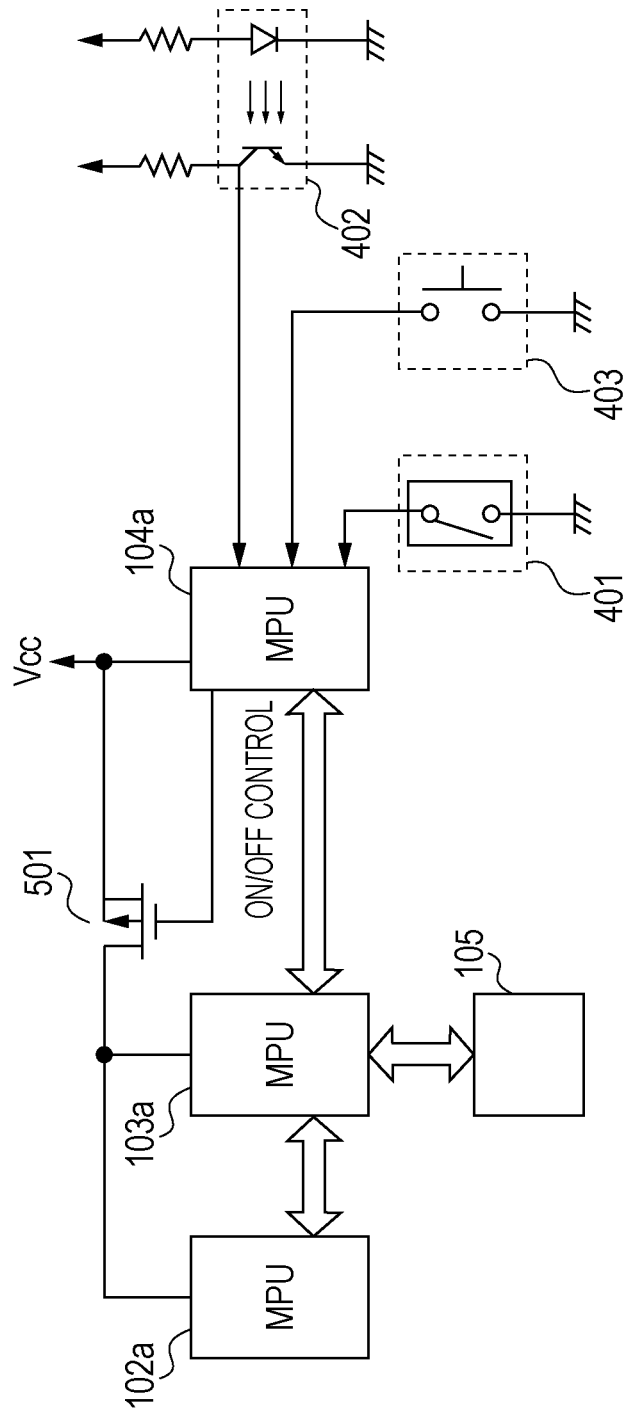
FIG. 2 is a diagram illustrating a circuit configuration of MPUs in a plurality of control units and associated circuit elements in an image forming apparatus.
Figure 3:
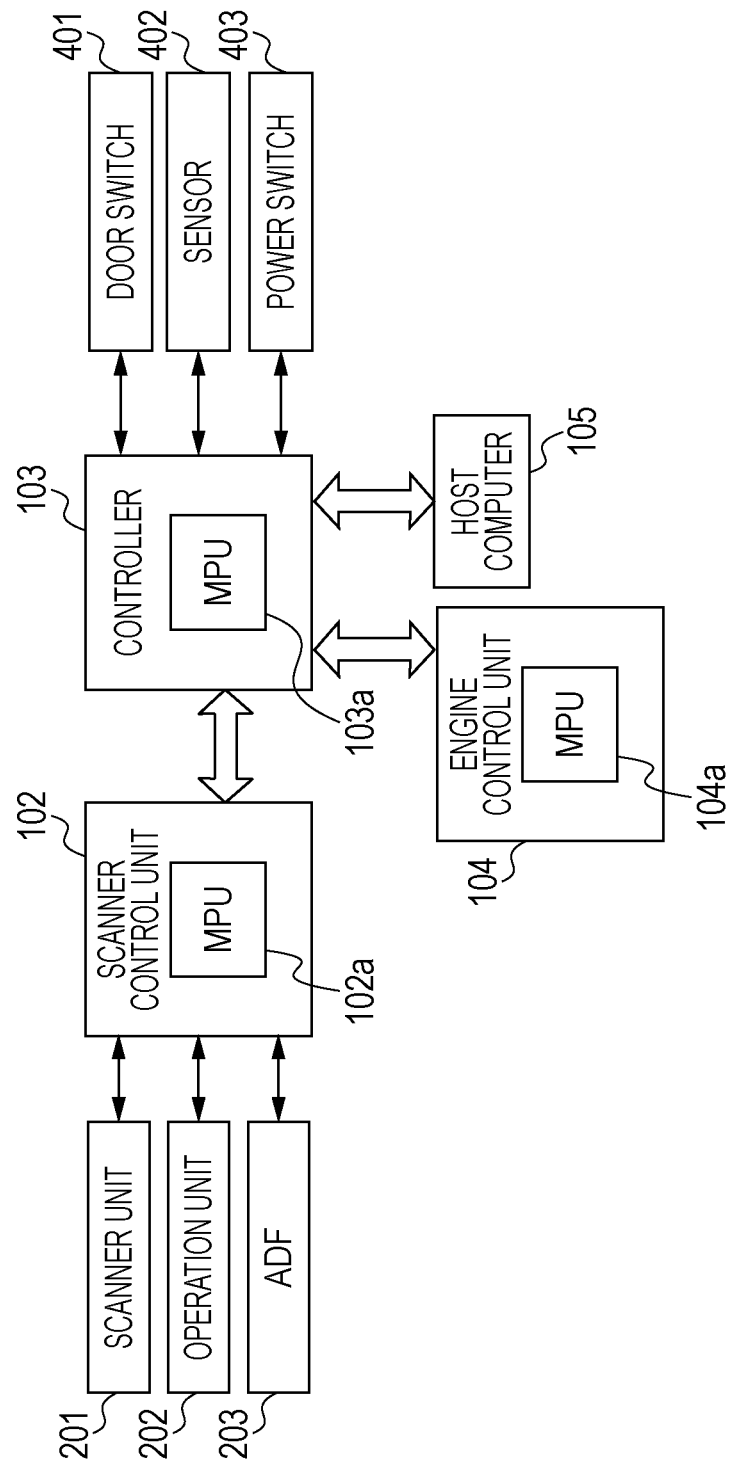
FIG. 3 is a control block diagram illustrating a configuration of a conventional image forming apparatus including a plurality of control units.
Figure 4:
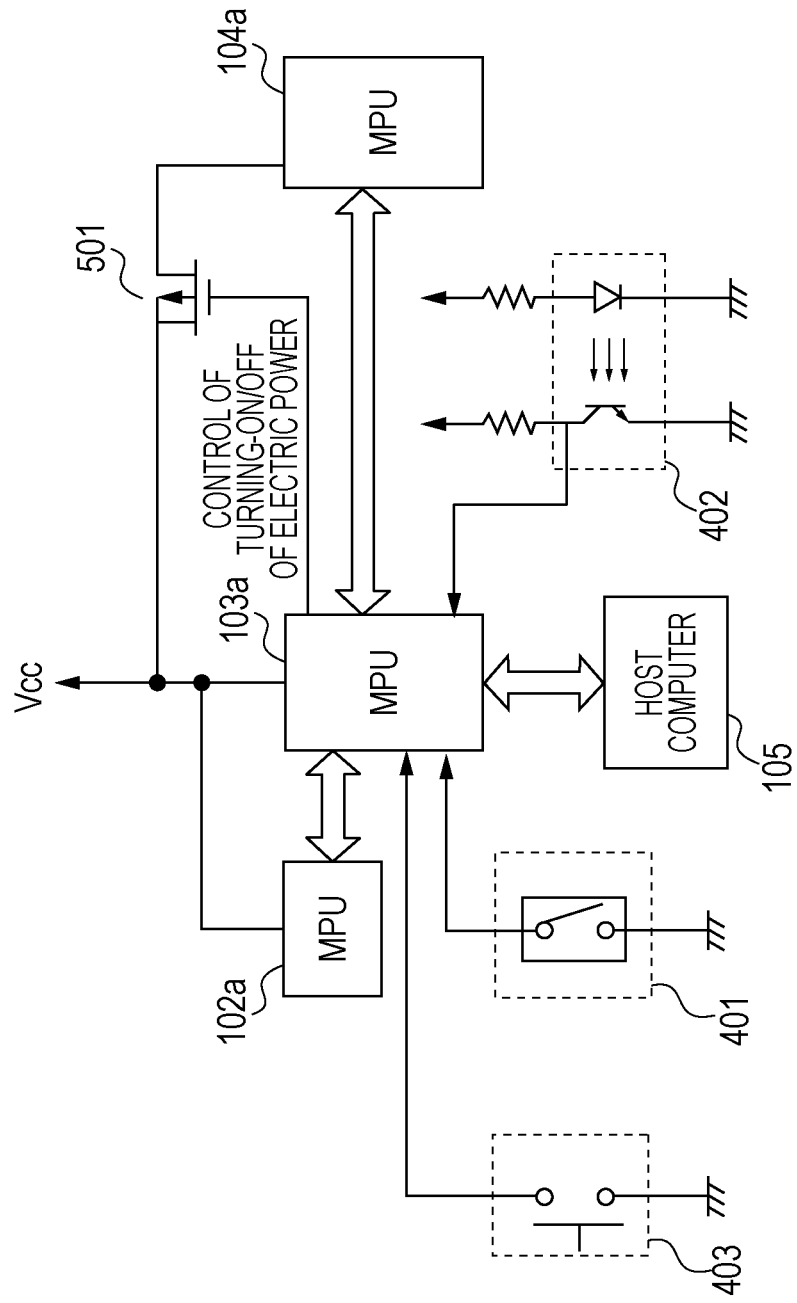
FIG. 4 is a diagram illustrating a circuit configuration of MPUs in a plurality of control units and associated circuit elements in a conventional image forming apparatus.

The basic configuration according to the present embodiment is similar to that described above with reference to FIGS. 1 and 2, and thus a further description thereof is omitted. FIG. 6 illustrates another example of a circuit configuration different from that shown in FIG. 2 in that the circuit includes an additional signal line L for transmitting a return signal from the MPU 103a to the MPU 104a and also includes an additional signal line L2 for detecting a connection to a host computer. This configuration is also different from that shown in FIG. 2 or 4 in that there are a plurality of power-saving operation modes. An operation according to the present embodiment is described in detail below with reference to FIGS. 5 to 13. Note that the door switch 401 is a switch for detecting whether a door disposed on the image forming apparatus is in a closed or opened state. The sensor 402 shown in FIG. 6, 8, or 11 may be a sensor configured to detect whether a recording material is present or not in a paper feed cassette serving as a paper feed unit in the image forming apparatus, a sensor configured to detect whether a consumable part such as a cartridge is removably mounted on the image forming apparatus, and/or other sensors configured to detect states of the image forming apparatus. The power switch 403 is a switch used to turn on/off a power supply of the image forming apparatus. A connection detection unit 404 is configured to detect a connection to the host computer by detecting a voltage output from a resistance voltage divider connected to a power supply of the host computer.

Configuration of microprocessor in engine control unit

Figure 5:
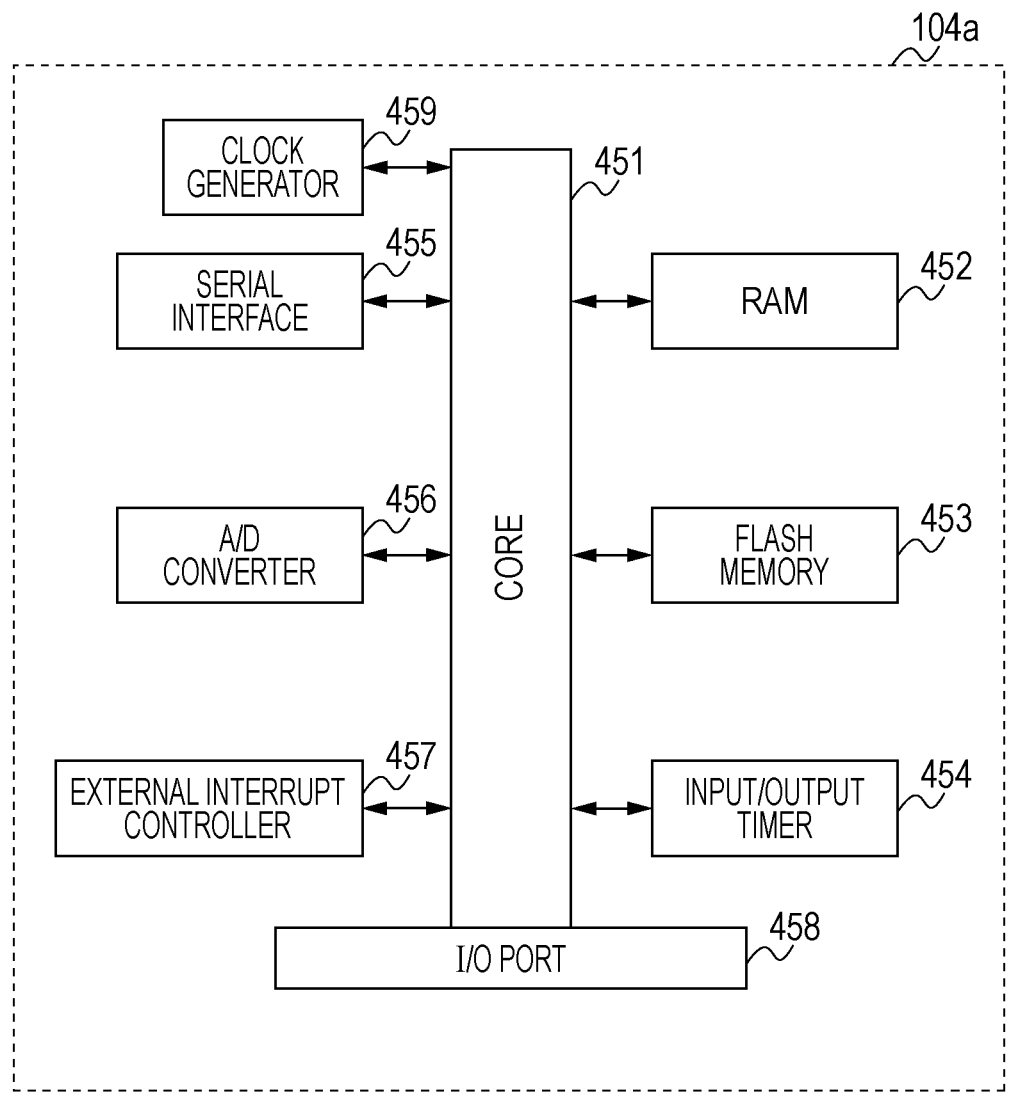
FIG. 5 is a block diagram illustrating an internal configuration of an MPU that controls an engine according to an embodiment of the present invention.
Figure 6:
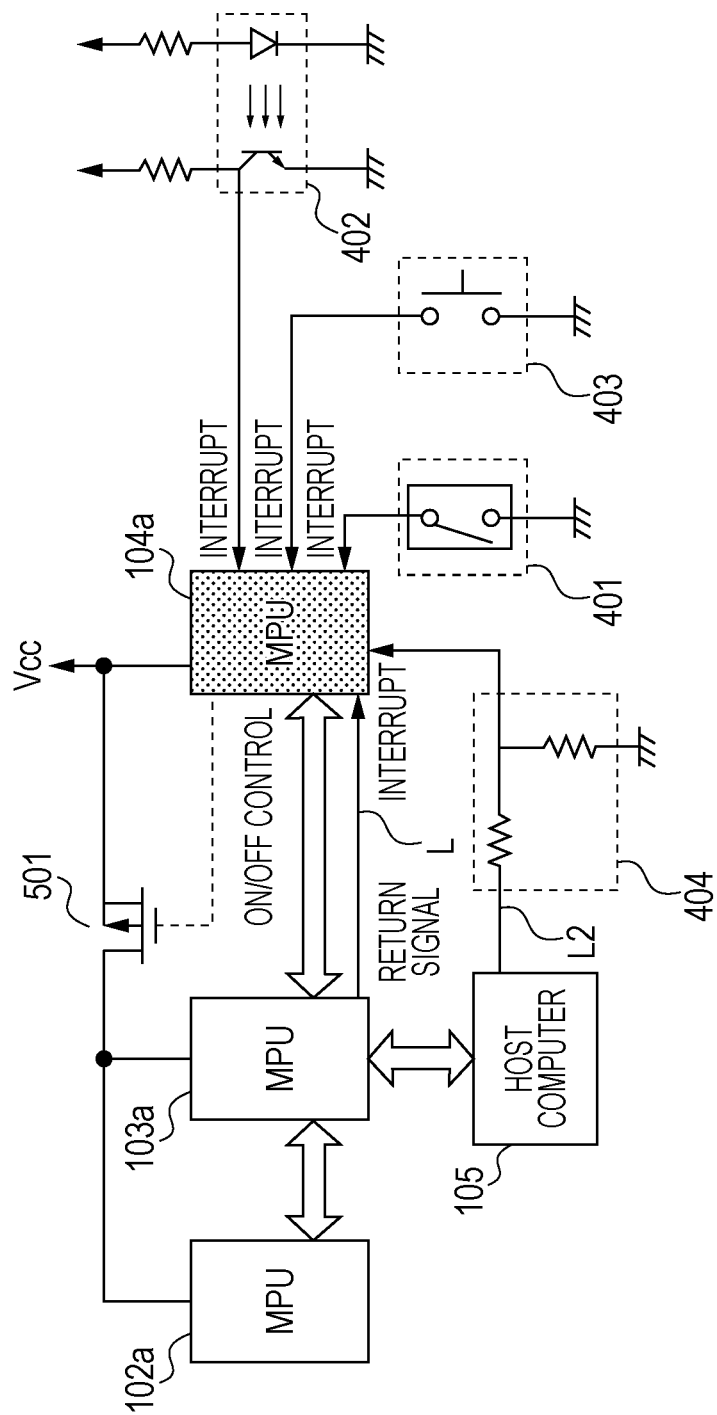
FIG. 6 is a diagram illustrating states of MPUs and associated circuit elements in a first power-saving operation mode according to an embodiment of the present invention.

FIG. 5 illustrates an internal configuration of a microprocessor unit (MPU) 104a that controls an engine. Main parts of the MPU 104a include a core 451, a RAM 452, a flash memory 453, an input/output timer 454, a serial interface 455, an analog-to-digital converter 456, an external interrupt control unit 457, an I/O port 458, and a clock generator 459. The core 451 operates in accordance with a clock generated by the clock generator 459. The core 451 is capable of performing high-speed processing on data received from the RAM 452, the flash memory 453, the input/output timer 454, the serial interface 455, the analog-to-digital converter 456, the interrupt control unit 457, or data input via the I/O port 458.

The RAM 452 is a volatile memory for temporarily storing data subjected to processing. Note that the data stored in this memory is lost when supplying of electric power is stopped. The flash memory 453 is used to store a program and data used in a control process. More specifically, in the present embodiment, a program and data for controlling an operation of forming an image by the image forming apparatus are stored in the flash memory 453. The input/output timer 454 is a counter whose count value is incremented in response to an internal oscillation clock from the clock generator 459. The serial interface 455 functions as an interface for transmitting and receiving information via two-way communication between the core 451 and the controller MPU 103a. The analog-to-digital converter 456 converts an analog voltage such as an operation voltage associated with the operation of forming an image into a digital value. An example of the operation voltage converted into a digital value is a voltage value (analog voltage value) supplied from a thermistor that detects the temperature of a fixing unit in the image forming apparatus. The interrupt control unit 457 operates such that when an interrupt signal is generated as a result of an occurrence of an external event, the interrupt control unit 457 temporarily stops a process being currently performed and transfers the control to a predefined program. The I/O port 458 is used to output a control signal issued by the MPU 104a from the core 451. For example, in accordance with the control signal output via the I/O port 458, driving of a motor in the image forming apparatus or applying of a high voltage is controlled. Conversely, signals output from various sensors are input via the I/O port 458, and the core 451 performs a process in accordance with the input signals.

Next, power-saving operation modes according to the present embodiment are described below. In the present embodiment, the image forming apparatus has three power-saving operation modes, i.e., a first power-saving operation mode, a second power-saving operation mode, and a third power-saving operation mode, which will be described in detail below. In the present embodiment, it is assumed that the image forming apparatus is configured such that when no operation is performed on the image forming apparatus over a predetermined period of time, the operation mode of the image forming apparatus is switched into one of the power-saving operation modes. Note that the length of the period of time after which the operation mode is switched into one of the power-saving operation modes may be selected arbitrarily. The length of the period of time may be set via an operation panel (not shown) disposed on the host computer 105 or the image forming apparatus. Instead of performing the switching of the operation mode in response to the elapse of the predetermined period of time, the operation mode may be switched into one of the power-saving operation modes in response to a command issued by the host computer.

[First Power-Saving Operation Mode]

The first power-saving operation mode (hereinafter also referred to as the power-saving operation mode #1) is a power-saving operation mode that allows to be switched into the normal operation mode with a short waiting time. In the power-saving operation mode #1, an oscillating operation of the engine control MPU 104*a* is stopped. The controller MPU 103*a* is responsible for controlling the operation of switching between the power-saving operation mode #1 and the normal operation mode. FIG. 6 illustrates a circuit operation of the MPU and associated circuit elements in the power-saving operation mode #1. In FIG. 6, a block representing the MPU 104*a* is shaded to indicate that the MPU 104*a* is in an inactivated state.

In FIG. 6, if the controller MPU 103*a* determines that a predetermined time (for example, 10 minutes) has elapsed since the end of a previous image forming operation, then the controller MPU 103*a* transmits a mode switch command #1 to the engine control MPU 104*a* via serial communication to instruct the engine control MPU 104*a* to switch into the power-saving operation mode #1. This mode switch command #1 transmitted from the MPU 103*a* is received by the MPU 104*a* via the serial interface 455.

In response, the MPU 104*a* sets the I/O port 458 such that the interrupt control unit 457 can detect a return signal transmitted from the MPU 103*a* (via a signal line L shown in FIG. 6), a signal from the power switch 403, a signal from the door switch 401, and a signal from the sensor 402. Thereafter, the oscillating operation of the MPU 104*a* is stopped and the operation mode is switched into the power-saving operation mode #1.

Figure 7:
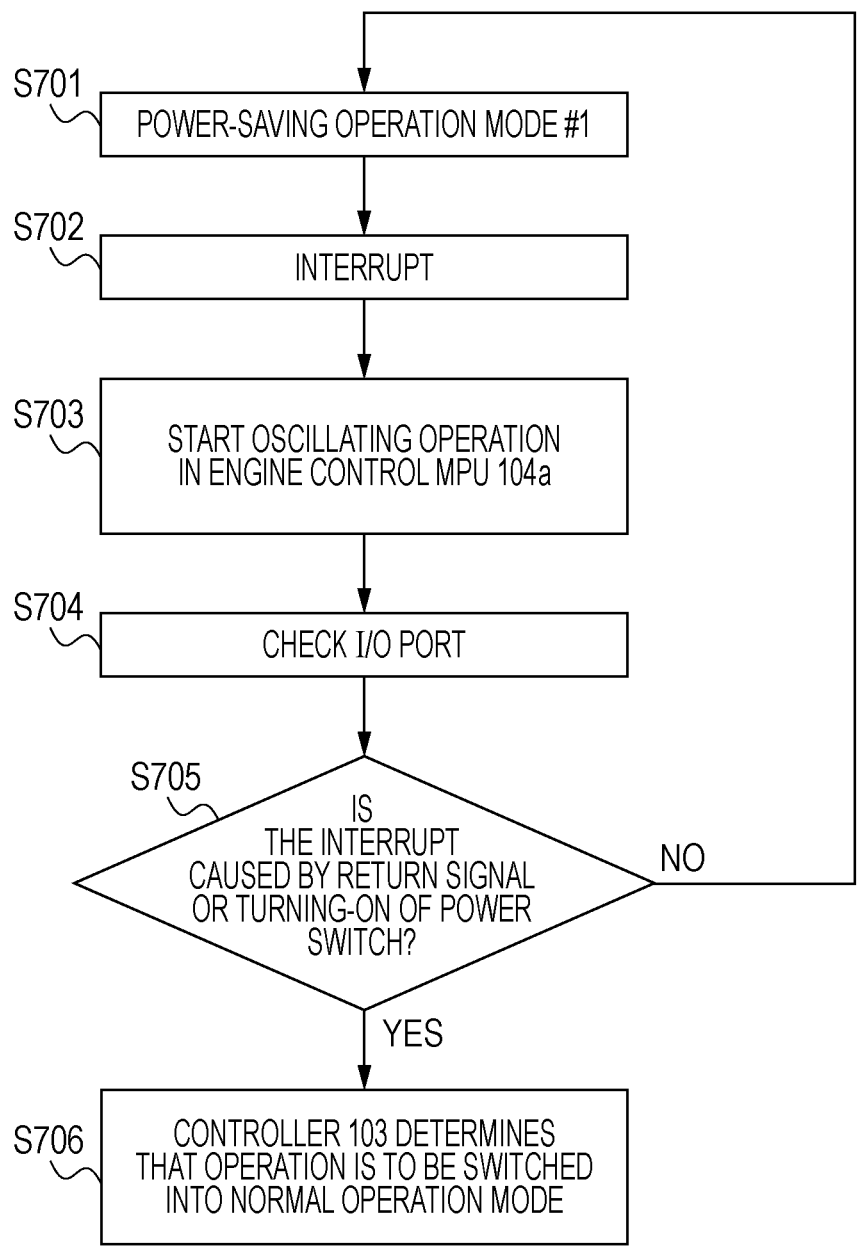
FIG. 7 is a flow chart illustrating a process of switching an operation mode from a first power-saving operation mode into a normal operation mode according to an embodiment of the present invention.

Next, the switching from the power-saving operation mode #1 to the normal operation mode is explained with reference to a flow chart shown in FIG. 7. First, when the image forming apparatus is in the power-saving operation mode #1 (step S701), an interrupt request to the engine control MPU 104*a* can occur (step S702). The interrupt request can occur when an interrupt signal is generated by the door switch 401, the sensor 402, or the power switch 403, which are shown in FIG. 6, or when a return signal serving as an interrupt signal is generated by the MPU 103*a*. If an interrupt request caused by an interrupt signal occurs, the engine control MPU 104*a* starts an oscillating operation (step S703). After the oscillating operation of the MPU 104*a* has become stable, the MPU 104*a* checks the I/O port 458 set by the interrupt control unit 457 (step S704) to determine the cause of the interrupt (step S705).

For example, in a case where the controller 103 receives a print command from the host computer 105 and accordingly outputs a return signal to the engine control MPU 104*a*, information associated with the print command is transmitted to the MPU 104*a* via serial communication. On the other hand, in a case where a change is detected in status of the door switch 401, the sensor 402, or the power switch 403, the engine control MPU 104*a* transmits information associated with the detected change in status to the controller 103 (MPU 103*a*) via serial communication. Note that the information associated with the detected change in status is information indicating a cause of the interrupt, i.e., information indicating which interrupt signal has caused the interrupt process to start. In accordance with the received information, the controller 103 determines the manner of switching the operation mode from the power-saving operation mode #1 (step S706). For example, in a case where the interrupt is caused by the return signal issued by the controller 103 in response to the print command, the controller 103 determines that the operation mode is to be switched into the normal operation mode from the power-saving operation mode #1. In a case where the interrupt is caused by a detection of a change in status of the power switch 403, the controller 103 determines that the operation mode is to be switched into the normal operation mode. In a case where the interrupt is caused by a change in status of the door switch 401 or the sensor 402, the controller 103 maintains the power-saving operation mode #1 without responding to the interrupt.

In a case where the checking of the I/O port 458 indicates that no change is detected in any of the power switch 403, the door switch 401, and the sensor 402 and no return signal from the controller MPU 103*a* is detected, the power-saving operation mode #1 is maintained. (Note that in a case where a signal other than a signal from the I/O port 458 set by the interrupt control unit 457 is detected, the signal is regarded as noise and the power-saving operation mode is maintained.) In the power-saving operation mode #1, as described above, the controller 103 controls switching and returning of the operation mode of the engine control MPU 104*a*.

[Second Power-Saving Operation Mode]

Figure 8:
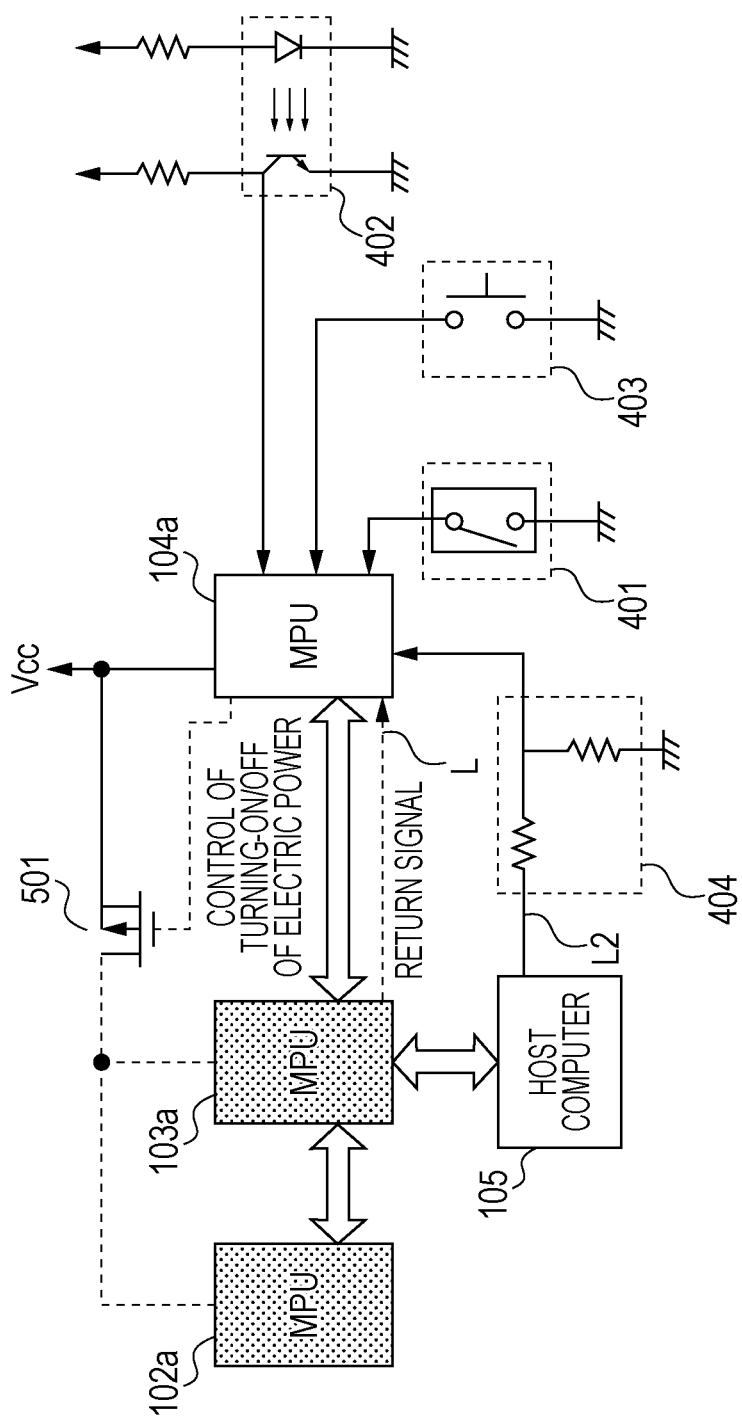
FIG. 8 is a diagram illustrating states of MPUs and associated circuit elements in a second power-saving operation mode according to an embodiment of the present invention.

A second operation mode (hereinafter also referred to as the power-saving operation mode #2) according to the present embodiment of the invention is described below. In the power-saving operation mode #2, a further reduction in power consumption is achieved compared with the power-saving operation mode #1. In the power-saving operation mode #2, the engine control MPU 104*a* is responsible for switching the operation mode between the power-saving operation mode and the normal operation mode. FIG. 8 illustrates a state of a circuit operation of the MPUs and associated circuit elements in the power-saving operation mode #2. The state shown in FIG. 8 is different from the state in the power-saving operation mode #1 shown in FIG. 6 in that supplying of electric power to the scanner control unit 102 (MPU 102*a*) and the controller 103 (MPU 103*a*) is stopped. In FIG. 8, a supply line from the switching element 501 to the MPU 102*a* and the MPU 103*a* is represented by a broken line to indicate that the supplying of electric power to the MPU 102*a* and the MPU 103*a* via this line is stopped. Because no electric power is supplied to the controller 103, an interrupt caused by a return signal from the MPU 103*a* does not occur. In FIG. 8, the signal line L is represented by a broken line to indicate that the interrupt caused by the return signal does not occur.

Figure 9:
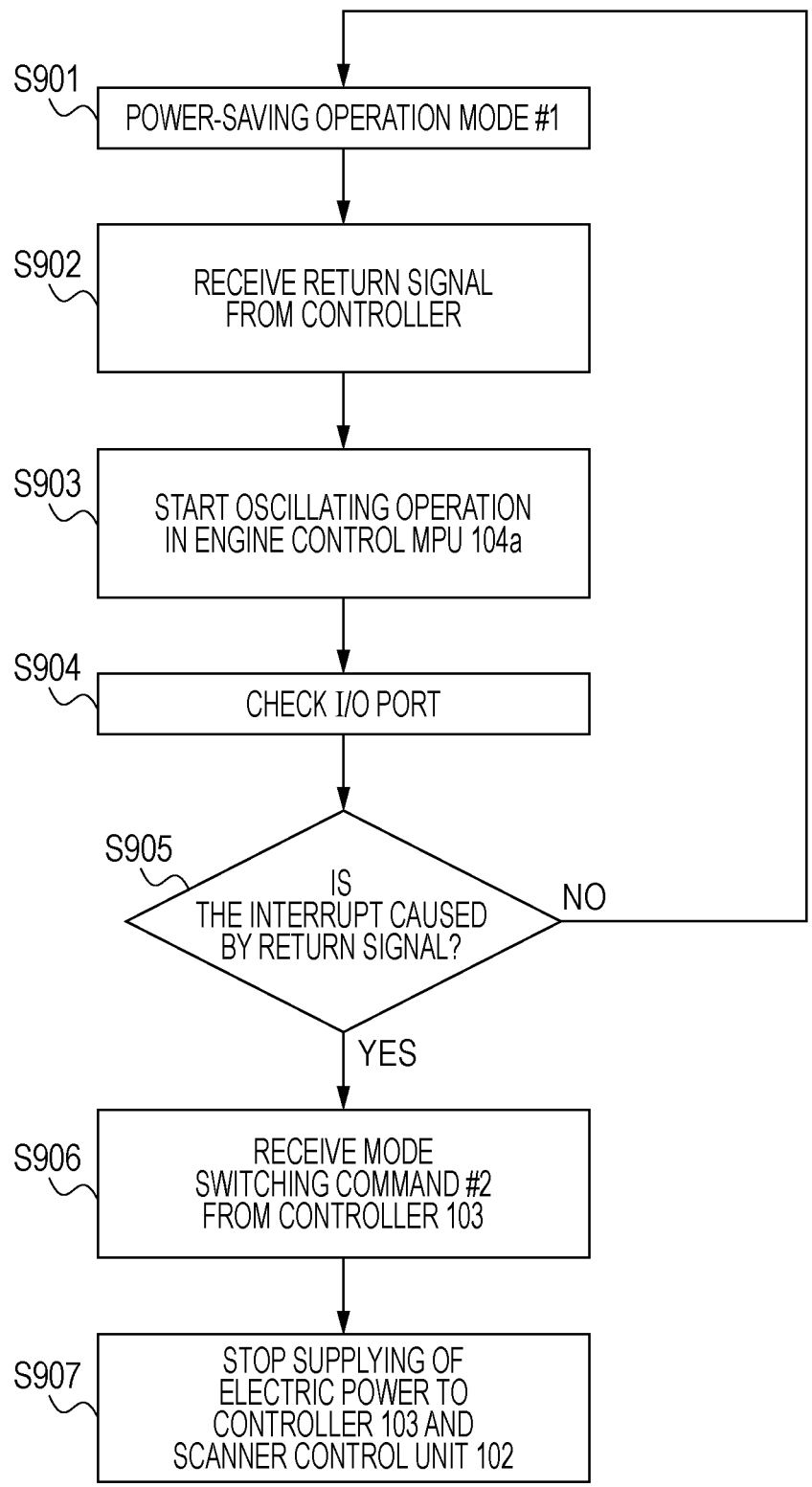
FIG. 9 is a flow chart illustrating a process of switching an operation mode into a second power-saving operation mode according to an embodiment of the present invention.

Next, referring to FIG. 9, an operation of switching into the power-saving operation mode #2 from the power-saving operation mode #1 is described below. When the image forming apparatus is in the power-saving operation mode #1 (step S901), if the controller 103 determines that a predetermined time (for example, 1 hour) has elapsed since the end of a previous image forming operation, then the controller 103 sends a return signal to the engine control MPU 104*a* (step S902). As a result of the reception of the return signal, an interrupt request to the engine control MPU 104*a* occurs, and thus the engine control MPU 104a starts the oscillating operation (step S903). After the oscillating operation has become stable, the MPU 104a checks the I/O port 458 set by the external interrupt control unit 457 (step S904) to determine the cause of the interrupt (step S905). In a case where the interrupt is caused by the return signal from the controller 103, the engine control MPU 104a receives via serial communication a mode switch command #2 from the controller 103 (step S906). In the case where the interrupt occurs by a cause other than the return signal, the power-saving operation mode #1 is maintained. In response to the mode switch command #2, the engine control MPU 104a stops supplying electric power to the controller MPU 103a and the scanner control MPU 102a thereby switching the operation mode into the power-saving operation mode #2 (step S907). In the power-saving operation mode #2, by stopping the supplying of electric power to the controller MPU 103a and the scanner control MPU 102a, a greater reduction in power consumption is achieved than is achieved in the power-saving operation mode #1.

Figure 10:
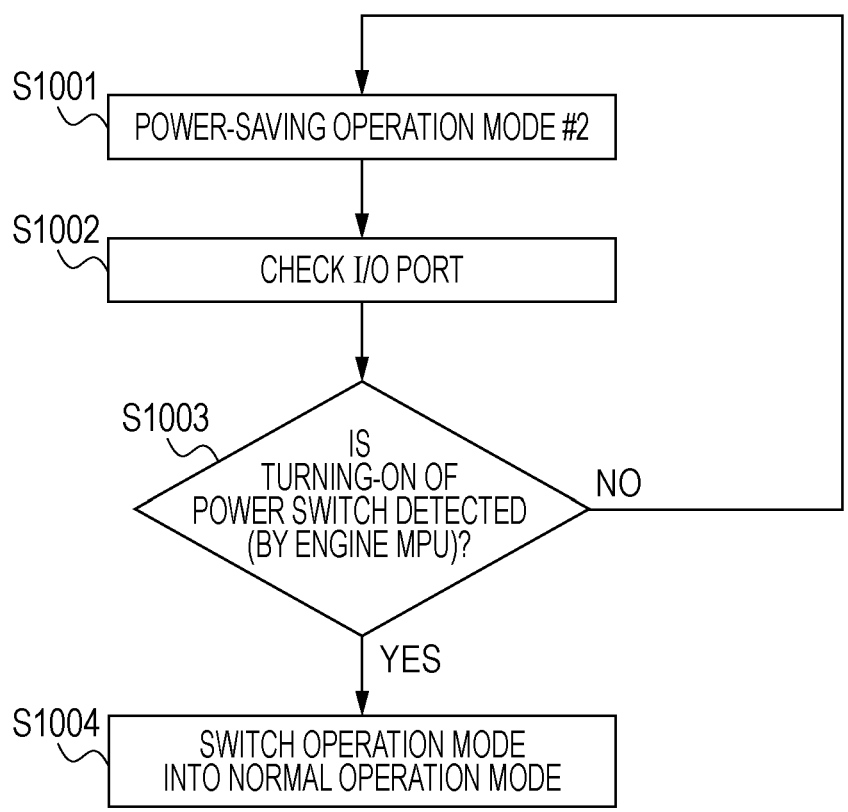
FIG. 10 is a flow chart illustrating a process of switching an operation mode from a second power-saving operation mode into a normal operation mode according to an embodiment of the present invention.

Next, an operation of switching into the normal operation mode from the power-saving operation mode #2 is explained with reference to FIG. 10. When the image forming apparatus is in the power-saving operation mode #2 (step S1001), the I/O port 458 is checked to determine whether a change has occurred in the state of the door switch 401, the sensor 402, or the power switch 403 (step S1002). The engine control MPU 104a determines whether the operation mode is to be switched into the normal operation mode from the power-saving operation mode #2 (step S1003). For example, in a case where a change in the state of the power switch 403 is detected, the operation mode is switched into the normal operation mode from the power-saving operation mode #2 (step S1004), however the operation mode is not switched into the normal operation mode in a case where the detected change in the state is that of the door switch 401 or the sensor 402. In the power-saving operation mode #2, as described above, the engine control MPU 104a controls the switching operation between the power-saving operation mode #2 and the normal operation mode.

[Third Power-Saving Operation Mode]

Figure 11:
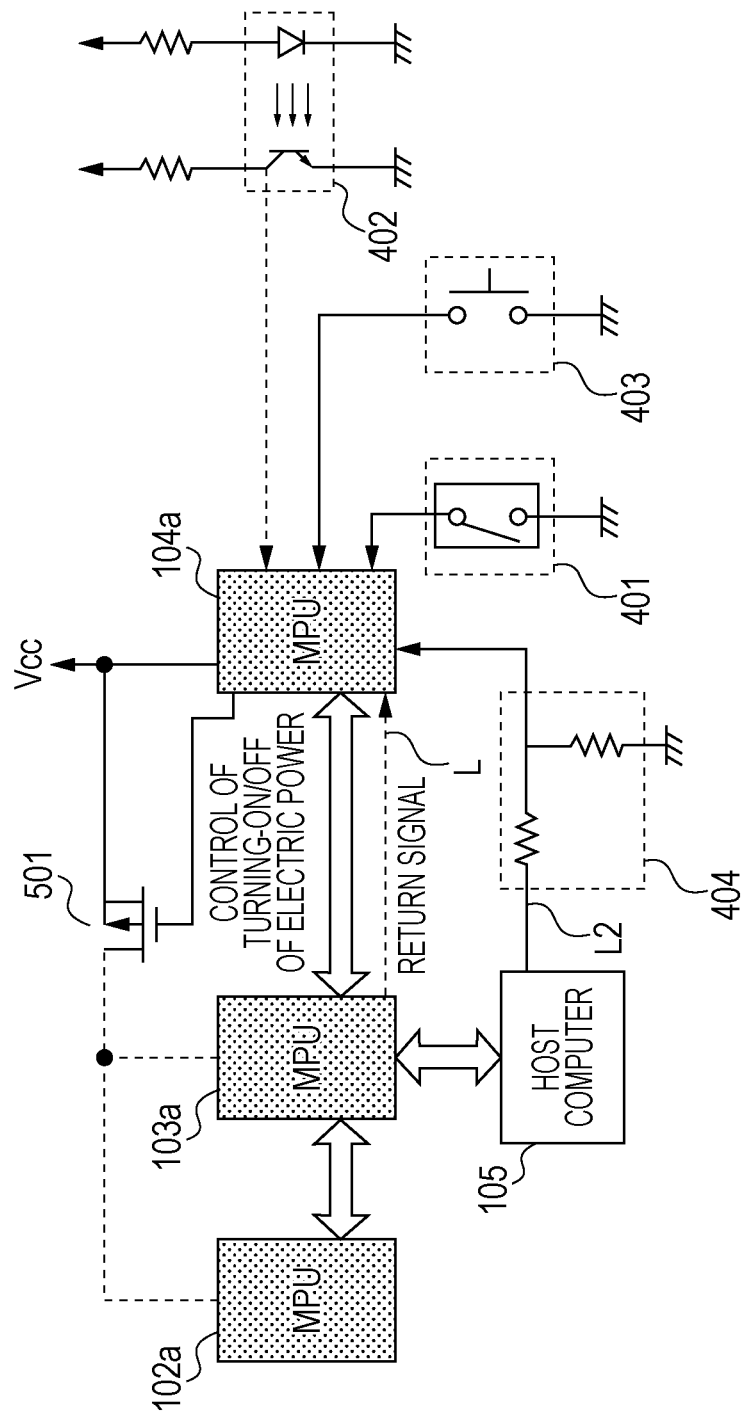
FIG. 11 is a diagram illustrating states of MPUs and associated circuit elements in a second power-saving operation mode according to an embodiment of the present invention.

Next, a third operation mode (hereinafter also referred to as the power-saving operation mode #3) according to the present embodiment of the invention is described below. In the power-saving operation mode #3, a still greater reduction in power consumption is achieved than is achieved in the power-saving operation mode #2. The power-saving operation mode #3 is a power-saving operation mode that allows a greatest reduction in power consumption of all power-saving operation modes (i.e., power-saving operation mode #3 is an operation mode with the lowest power consumption). In the power-saving operation mode #3, the operations of all MPUs (the MPU 102a, the MPU 103a, and the MPU 104a) are stopped. FIG. 11 illustrates a state of a circuit operation of the MPUs and associated circuit elements in the power-saving operation mode #3. In this state shown in FIG. 11, the image forming apparatus is in the power-saving operation mode #3 in which the operations of all MPUs are stopped, and no electric power is supplied to the MPU 102a and the MPU 103a. In FIG. 11, blocks of all MPUs are shaded to indicate that these MPUs are in an inactivated state. The supply line from the switching element 501 to the MPU 102a and the MPU 103a is represented by a broken line to indicate that the supplying of electric power to the MPU 102a and the MPU 103a via this line is stopped.

Figure 12:
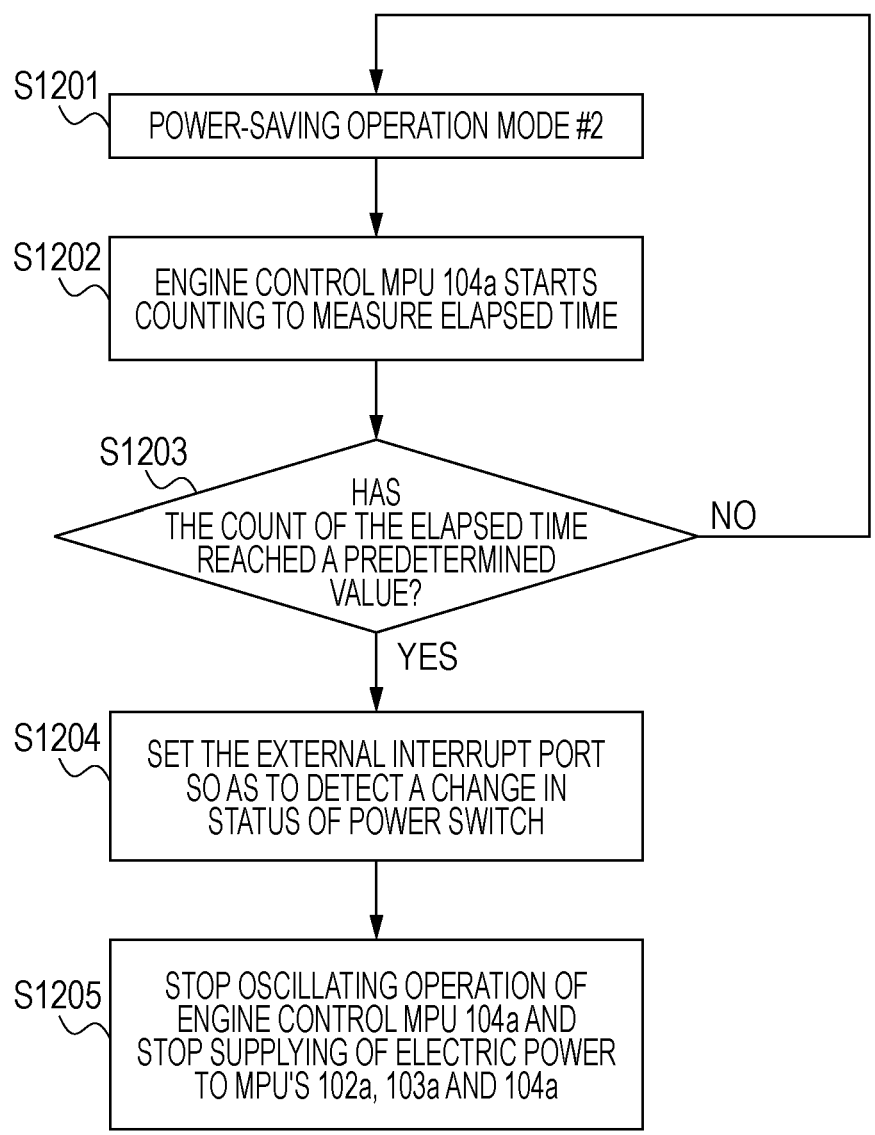
FIG. 12 is a flow chart illustrating a process of switching an operation mode into a third power-saving operation mode according to an embodiment of the present invention.

Referring to FIG. 12, an operation of switching into the power-saving operation mode #3 from the power-saving operation mode #2 is described below. When the image forming apparatus is in the power-saving operation mode #2 (step S1201), the engine control MPU 104a measures a time using the input/output timer 454 (step S1202) to determine whether a predetermined time (for example, 5 hours) has elapsed since the image forming apparatus switched into the power-saving operation mode #2 (step S1203). If it is determined that the predetermined time has elapsed, the external interrupt control unit 457 sets the I/O port 458 to detect a change in the state of the power switch 403 (step S1204). Thereafter, the oscillating operation of the engine control MPU 104a is stopped to switch the operation mode into the power-saving operation mode #3 while maintaining the switching element 501 in the OFF-state such that no electric power is supplied to the MPU 102a and the MPU 103a (step S1205).

Figure 13:
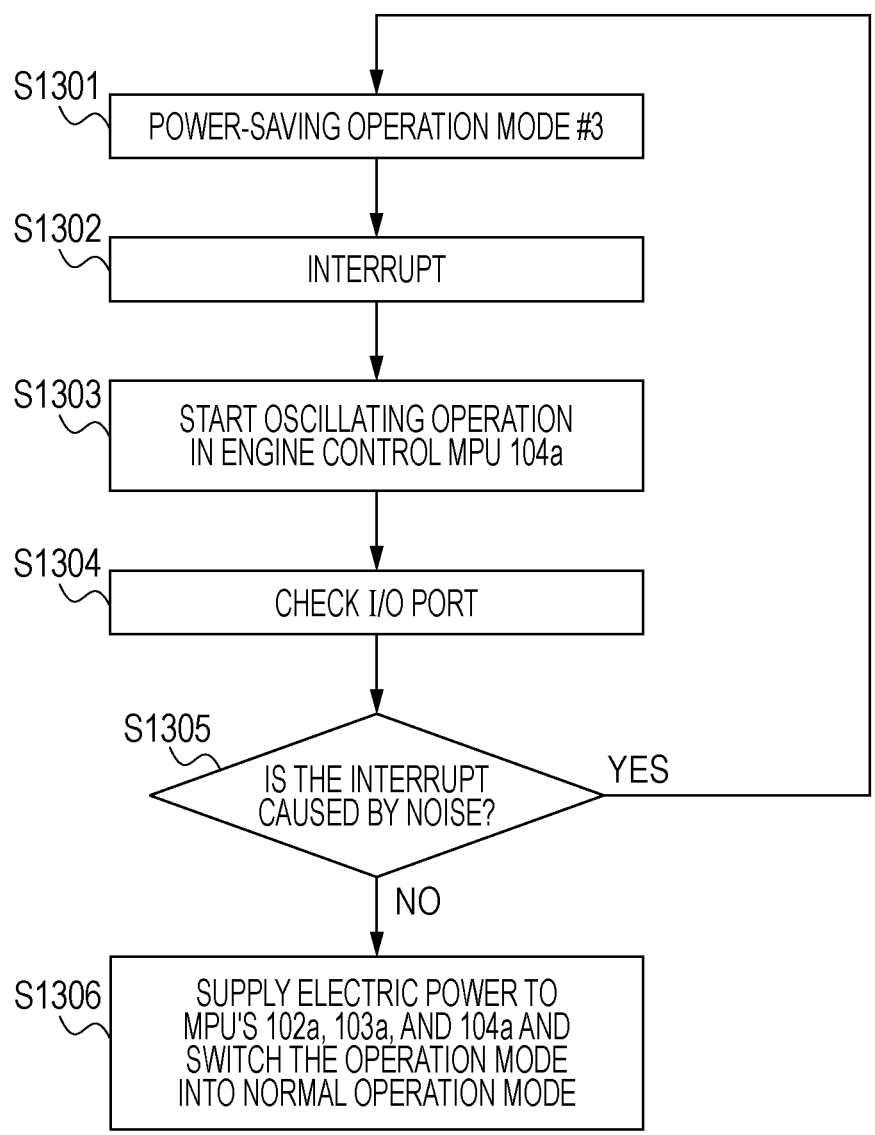
FIG. 13 is a flow chart illustrating a process of switching an operation mode from a third power-saving operation mode into a normal operation mode according to an embodiment of the present invention.

Next, an operation of switching into the normal operation mode from the power-saving operation mode #3 is described with reference to FIG. 13. When the image forming apparatus is in the power-saving operation mode #3 (step S1301), if an interrupt request to the engine control MPU 104a occurs (step S1302), the engine control MPU 104a starts the oscillating operation (step S1303). After the oscillating operation has become stable, the state of the I/O port 458 set by the external interrupt control unit 457 is checked to detect a signal indicating a change in the state of the power switch 403 (step S1304). A determination is made as to whether the detection of the signal is caused by noise by determining whether the I/O port 458 remains in the detected state over a predetermined period (step S1305). In a case where it is determined that the detection of the signal is caused by noise, the power-saving operation mode #3 is maintained. On the other hand, in a case where it is determined that the detection of the signal is not caused by noise, the switching element 501 is turned on to supply electric power to the controller 103 (step S1306).

In the power-saving operation mode #3, as described above, the switching into the normal operation mode is performed only when a return trigger from the power switch is detected. That is, the switching into the normal operation mode is performed without needing the control by the MPUs.

As described above, depending on which one of the three power-saving operation modes with different power-saving levels the image forming apparatus is currently in or is to be switched into, the MPU is switched which is responsible for switching the operation mode between the normal operation mode and one of the power-saving operation modes thereby achieving a great reduction in power consumption of the image forming apparatus and achieving high usability.

In the embodiment described above, by way of example, the return trigger that causes the operation mode to switch into the normal operation mode is generated by the door switch 401 that detects the opened/closed state of the door, the sensor 402, or the power switch 403 used to turn on/off the power supply. However, the return triggers are not limited to those described above. For example, an operation on the operation panel of the operation unit 202, a detection of setting of a document on a document reading part of the ADF 203, a detection of opening/closing of a document lid of the document reading part, or the like may cause a return trigger to occur.

Figure 14:
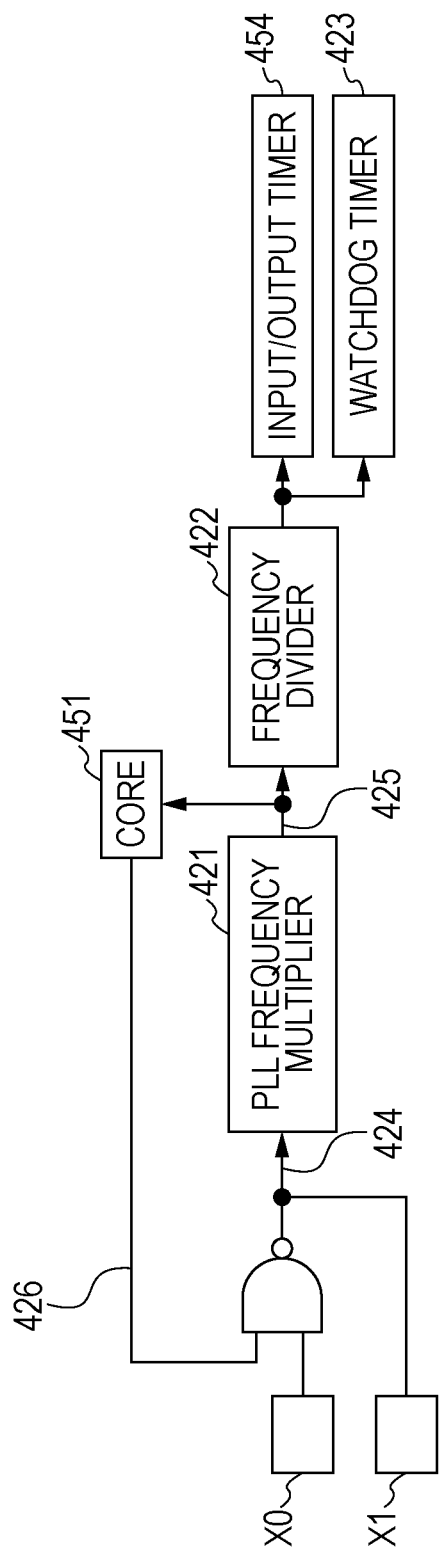
FIG. 14 is a block diagram illustrating an internal configuration of a clock generator in an MPU that controls an engine according to an embodiment of the present invention.

Next, a second embodiment of the present invention is described below. The second embodiment discloses a technique to handle an erroneous operation of the engine control MPU 104a that can occur when the oscillating operation of the engine control MPU 104a is stopped in the power-saving operation mode #1 or #3 in the first embodiment described above. FIG. 14 is a block diagram illustrating an internal configuration of the clock generator 459 in the engine control MPU 104*a*. Outputs of a crystal oscillator (not shown) are connected to terminals X0 and X1 of the clock generator 459. An oscillation clock 424 is generated by driving the crystal oscillator. If an oscillation stop command signal 426 transmitted from the core 451 is received, the oscillation of the oscillation clock 424 is stopped. Based on the oscillation clock 424, a PLL frequency multiplier 421 generates a main clock 425. The core 451 of the engine control MPU 104*a* in accordance with the main clock 425. The main clock 425 is divided by a frequency divider 422, and a resultant clock is used by the input/output timer 454 and a watchdog timer 423. When the oscillating operation of the engine control MPU 104*a* is stopped, the watchdog timer 423 is stopped. Thus, it is necessary to take into consideration a possibility that an erroneous operation (such as a runway operation) occurs in the engine control MPU 104*a*.

Figure 15:
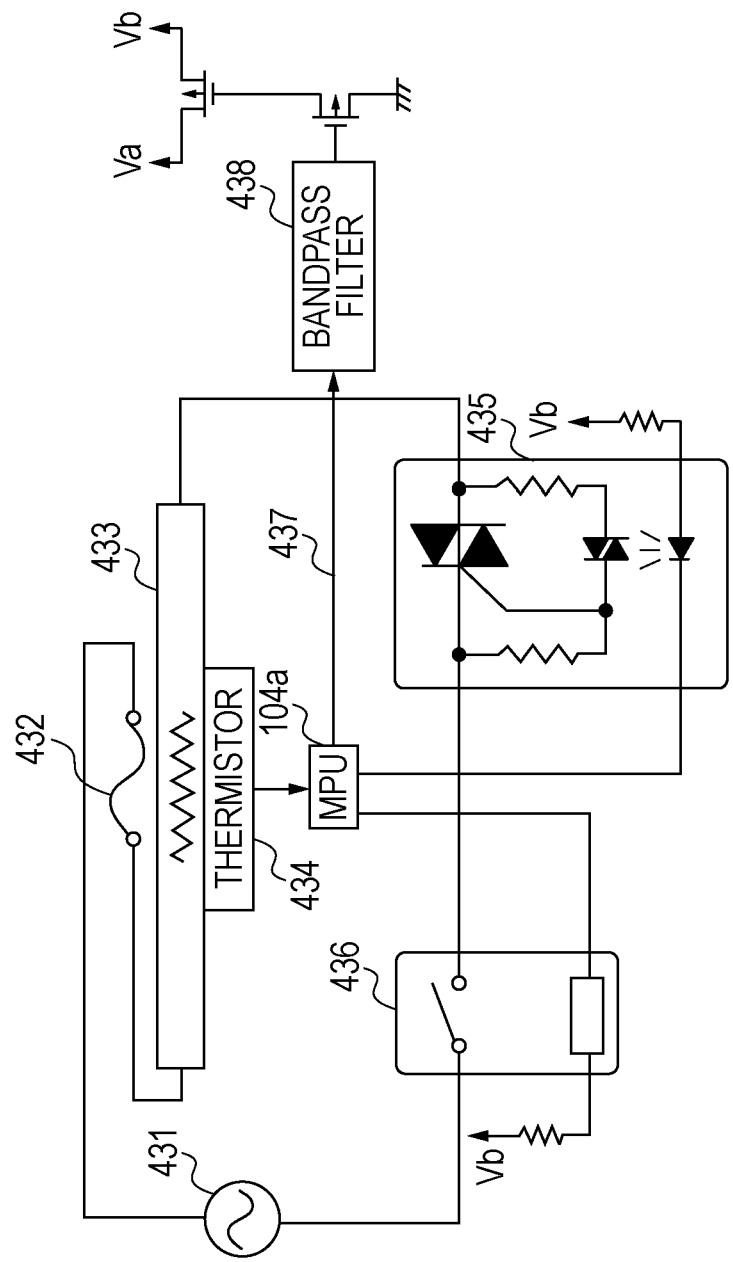
FIG. 15 is a diagram illustrating a heater control unit of a fixing unit according to an embodiment of the present invention.

The engine control MPU 104*a* controls the whole operation of the engine unit. Thus, the operation controlled by the engine control MPU 104*a* includes the control of applying a high voltage, the control of driving a motor, the control of the temperature of the fixing unit, etc. Herein, the method of handling an erroneous operation according to the present embodiment is disclosed, by way of example, in terms of the control of the temperature of the fixing unit. FIG. 15 illustrates a heater control unit that controls the temperature of the fixing unit. A fixing heater 433 operates with a voltage supplied by an AC power supply 431. In a supply line of the AC power supply 431, a protection element 432, a semiconductor switch module 435, and a relay module 436 are connected in series. A thermal fuse or a thermostat may be used as the protection element 432 that detects the temperature and turns off the electric power to the fixing heater 433 when the detected temperature is higher than a predetermined value. If the engine control MPU 104*a* determines that the thermistor 434 detects an abnormal temperature (abnormally high temperature), then the engine control MPU 104*a* turns off the relay module 436 to stop the supplying of electric power to the fixing heater 433. The engine control MPU 104*a* turns on/off the semiconductor switch module 435 such that the temperature detected by the thermistor 434 is constant.

Next, a power supply Vb is described below. The power supply Vb is electrically isolated from the AC power supply 431 and is used by the relay module 436 and the semiconductor switch module (such as a triac) 435. The turning-on/off of the power supply Vb is controlled in accordance with a clock signal 437 generated by the input/output watchdog timer 423 in the engine control MPU 104*a*. If the clock signal 437 is within a predetermined frequency range, the clock signal 437 is smoothed by a bandpass filter 438, and the resultant signal generates, from a power supply Va, the power supply Vb used by the relay module 436 and the semiconductor switch module 435. In this configuration, when the engine control MPU 104*a* stops the oscillating operation in the power-saving operation mode #1 or #3 in the first embodiment described above, the oscillation clock 424 shown in FIG. 14 is stopped and thus the clock signal 437 is not generated. Thus, in this state, the power supply Vb used by the relay module 436 and the semiconductor switch module 435 is not generated, which prevents the fixing unit from becoming abnormally high in temperature even when an erroneous operation (such as runaway) occurs in the engine control MPU 104*a*.

The method of handling an erroneous operation according to the present embodiment has been described above, by way of example, in terms of the control of the temperature of the fixing unit. Note that the above-described method of handling an erroneous operation, which can occur when the oscillating operation of the engine control MPU 104*a* is stopped, may also be applied to the control of applying the high voltage and the control of driving the motor. In the embodiment described above, the bandpass filter 438 is used to smooth the clock signal 437. Alternatively, other filters such as an AC coupling filter may be used as long as the filter allows only the clock signal to pass through.

Next, a third embodiment of the present invention is described below. In this third embodiment, when an interrupt request for switching from the power-saving operation mode #1 to the normal operation mode occurs, the interrupt request is handled in a different manner from that according to the first embodiment described above. In the case of the first embodiment, as shown in FIG. 7, in the switching from the power-saving operation mode #1 to the normal operation mode, the cause of the interrupt is determined by checking the state of the I/O port 458. In the third embodiment, when an interrupt occurs due to a change in the status of the door switch 401, the sensor 402, or the power switch 403 or due to a return signal issued by the controller 103, the engine control MPU 104*a* performs a different process depending on the interrupt request.

Figure 16:
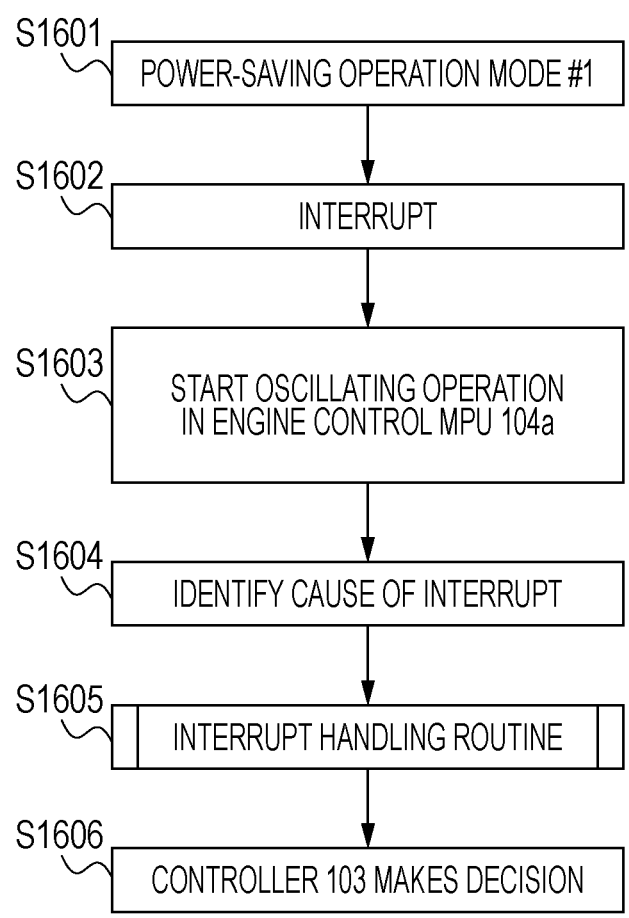
FIG. 16 is a flow chart illustrating a process of switching an operation mode from a first power-saving operation mode into a normal operation mode according to an embodiment of the present invention.

An operation of switching the operation mode into the normal operation mode from the power-saving operation mode #1 according to the present embodiment is described with reference to FIG. 16. When the image forming apparatus is in the power-saving operation mode #1 (step S1601), an interrupt request to the engine control MPU 104*a* can occur (step S1602). If an interrupt request occurs, and thus the engine control MPU 104*a* starts the oscillating operation (step S1603). After the oscillating operation of the MPU 104*a* has become stable, the MPU 104*a* determines the cause of the interrupt (step S1604), and performs a different process depending on the cause of the interrupt (step S1605). More specifically, for example, in a case where the interrupt is caused by a change in the status of the door switch 401, a process is performed to determine whether a detachable/attachable consumable member (not shown) has been exchanged. In a case where the interrupt is caused by a change in the status of the power switch 403, the process described above is not performed. The engine control MPU 104*a* transmits information indicating the cause of the interrupt to the controller 103 via serial communication. Depending on the situation, the controller 103 determines whether the operation mode is to be switched from the power-saving operation mode #1 into the normal operation mode (step S1606). The consumable member is a member that is consumed as an image is formed. Examples of consumable members are a photosensitive drum on which an image is formed, a developer container for storing a developer such as toner or ink with which to form the image, etc.

In the present embodiment, because the process is performed differently depending on the cause of the interrupt, it is possible to minimize the waiting time. In the specific example described above, the waiting time is minimized by performing or not performing the process depending on the cause of the interrupt.

The engine control MPU 104*a* may define interrupt levels for the respective causes of the interrupt (a change in the status of the door switch 401, the sensor 402, or the power switch 403 or a return signal issued by the controller 103) and may handle interrupts according to priority assigned to the levels when a plurality of interrupts occur at the same time. For example, interrupt level 4 may be assigned to the power switch 403, interrupt level 3 to the return signal issued by the controller 103, interrupt level 2 to the door switch 401, and interrupt level 1 to the sensor 402. Note that the higher the interrupt level, the higher the priority. That is, higher priority is assigned in the order the power switch 403, the return signal issued by the controller 103, the door switch 401, the sensor 402. The information associated with the interrupt is transmitted to the controller 103 in accordance with the priority defined above. Note that the above-described manner of defining the priority is merely an example, and the priority may be defined in an arbitrary manner.

Figure 17:
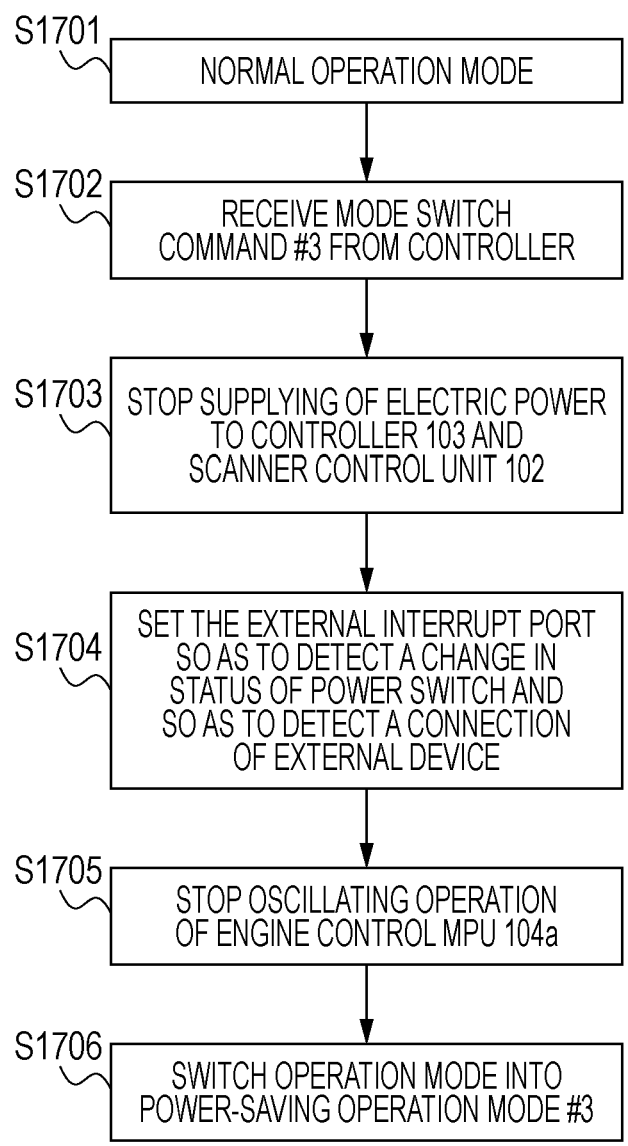
FIG. 17 is a flow chart illustrating a process of switching an operation mode from a normal operation mode into a third power-saving operation mode according to an embodiment of the present invention.

Next, a fourth embodiment of the present invention is described below. In this fourth embodiment, the method of switching the operation mode between the normal operation mode and the power-saving operation mode #1 according to the first embodiment described above is applied to a case where a host computer is used. By way of example, it is assumed that the host computer 105 is connected to the controller 103 via a USB (Universal Serial Bus) cable. In response to a command issued by the host computer, the operation mode may be switched from the normal operation mode into the power-saving operation mode #3 in a manner described below with reference to FIG. 17. When the image forming apparatus is in the normal operation mode, (step S1701), the host computer may transmit a mode switch command #3 to the controller MPU 103a to instruct the controller MPU 103a to switch the operation mode into the power-saving operation mode #3. The mode switch command #3 transmitted from the MPU103a is received by the engine control MPU 104a via the serial interface 455 (step S1702). The following process is performed in a similar manner to the first embodiment. That is, the engine control MPU 104a stops supplying electric power to the controller MPU 103a and the scanner control MPU 102a (step S1703). The external interrupt control unit 457 then sets the I/O port 458 such that a change in the state of the power switch 403 and a connection to an external device (via a signal line L2 shown in FIG. 6) can be detected (step S1704). Thereafter, the oscillating operation of the engine control MPU 104a is stopped (step S1705) thereby switching the operation mode into the power-saving operation mode #3 (step S1706).

Figure 18:
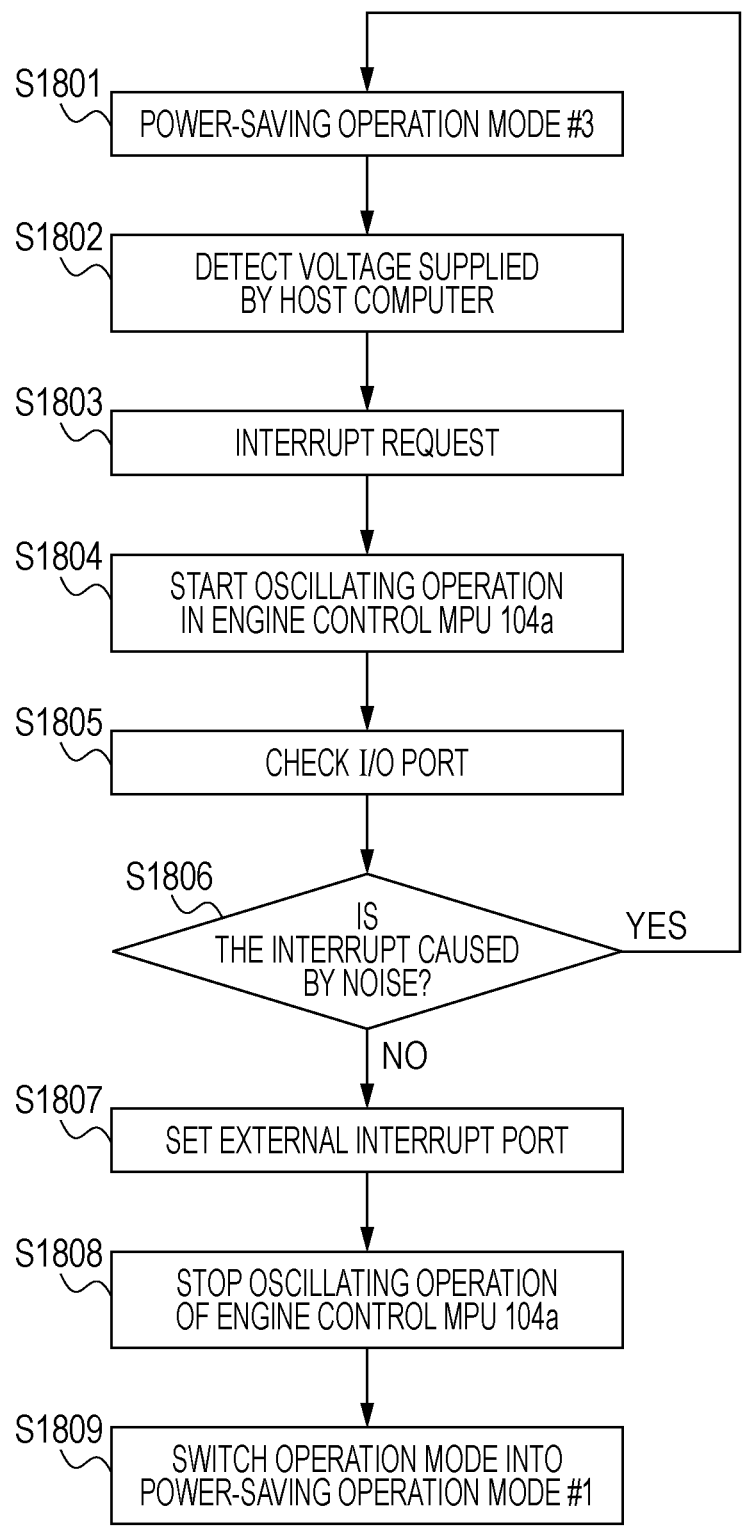
FIG. 18 is a flow chart illustrating a process of switching an operation mode from a third power-saving operation mode into a first power-saving operation mode according to an embodiment of the present invention.

Next, an operation of switching the operation mode from the power-saving operation mode #3 into the power-saving operation mode #1 is described with reference to FIG. 18. When the image forming apparatus is in the power-saving operation mode #3 (step S1801), if the power supply of the host computer is turned on and the connection detection unit 404 detects a voltage supplied via the USB cable, (step S1802), an interrupt request to the engine control MPU 104a occurs (step S1803). In response, the engine control MPU 104a starts the oscillating operation (step S1804). After the oscillating operation has become stable, the state of the I/O port 458 set by the external interrupt control unit 457 is checked to determine whether a connection detection signal indicating a connection to the external device is detected (step S1805). A determination is made as to whether the detection of the signal is caused by noise by determining whether the I/O port 458 remains in the detected state over a predetermined period (step S1806). In a case where it is determined that the detection of the signal is caused by noise, the power-saving operation mode #3 is maintained. On the other hand, in a case where it is determined that the detection of the signal is not caused by noise, the oscillating operation of the engine control MPU 104a is stopped. Thereafter, the MPU 104a sets the I/O port 458 such that the interrupt control unit 457 can detect a return signal transmitted from the MPU 103a (via the signal line L shown in FIG. 6), a signal from the power switch 403, a signal from the door switch 401, and a signal from the sensor 402 (step S1807). The oscillating operation of the MPU 104a is then stopped (step S1808), and the operation mode is switched into the power-saving operation mode #1 (step S1809).

In the present embodiment, the operation mode can be switched into a desired power-saving operation mode without having to directly access the image forming apparatus. In the present embodiment, in response to a detection of a connection to an external device, the operation mode is switched to a higher-level power-saving operation mode. On the other hand, when a print command is received, the operation mode is switched into the normal operation mode. Thus, high usability can be achieved while achieving a great reduction in power consumption.

In the embodiment described above, it is assumed by way of example that the operation mode is switched into the power-saving operation mode #3. Alternatively, the operation mode may be switched into the power-saving operation mode #1 or #2.

[Power-Saving Operation Mode in a State in Which AC Power is Supplied]

An operation in power-saving operation modes is described below for a case where AC power is supplied. In the state in which the AC power is supplied, the engine control MPU 104a performs a resetting operation to initialize the operation status. Thereafter, the operation mode is switched into the power-saving operation mode #2 as in the first embodiment described above. Thereafter, the external interrupt control unit 457 sets the I/O port such that a change in the state of the power switch 403 is detected. Thereafter, the oscillating operation of the engine control MPU 104a is stopped and the operation mode is switched into the power-saving operation mode #3. For example, in a case where a soft switch is used as a main switch of the apparatus, when the soft switch is in an OFF state, the apparatus may be set to be in the power-saving operation mode #3 thereby achieving a further reduction in power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-266489 filed Nov. 24, 2009, which is hereby incorporated by reference herein in its entirety.

What is claimed is:

1. An image forming apparatus comprising:
a first control unit configured to control an operation of an image forming unit; and
a second control unit configured to transmit information for forming an image to the first control unit,
the image forming apparatus having a normal operation mode in which an image forming operation is performed, a first power-saving operation mode in which an operation of the first control unit is stopped, and a second power-saving operation mode in which supplying of electric power to the second control unit is stopped,
the image forming apparatus further comprising:
a power supply unit configured to supply electric power to the image forming apparatus;
a state detection unit configured to detect a state of the image forming unit; and
a connection detection unit configured to detect whether an external device is connected to the image forming apparatus,
the second control unit being configured such that when the image forming apparatus is in the first power-saving operation mode, the second control unit determines whether the image forming apparatus is to switch into the normal operation mode from the first power-saving operation mode in response to a signal from the power supply unit, a signal from the state detection unit, or a return signal from the second control unit, the first control unit being configured such that when the image forming apparatus is in the second power-saving operation mode, the first control unit determines whether the image forming apparatus is to switch into the normal operation mode from the second power-saving operation mode in response to the signal from the power supply unit or the signal from the state detection unit, the first control unit being configured such that when the image forming apparatus is in the second power-saving operation mode, the first control unit determines whether the image forming apparatus is to switch into the normal operation mode or the first power-saving operation mode from the second power-saving operation mode in response to a signal from the connection detection unit.

2. The image forming apparatus according to claim 1, further having a third power-saving operation mode in which an operation of the first control unit is stopped and supplying of electric power to the second control unit is stopped, wherein when the image forming apparatus is in the third power-saving operation mode, the second control unit switches into the normal operation mode in response to a signal from the power supply unit, and wherein when the image forming apparatus is in the third power-saving operation mode, the second control unit switches into the normal operation mode, the first power-saving operation mode, or the second power-saving operation mode in response to a signal from the connection detection unit.

3. The image forming apparatus according to claim 2, further comprising a third control unit configured to be capable of communicating with the second control unit and configured to control a scanner unit configured to read a document, wherein supplying of electric power to the third control unit is stopped when the image forming apparatus is in any one of the second power-saving operation mode and the third power-saving operation mode.

4. The image forming apparatus according to claim 3, wherein switching into the first power-saving operation mode, the second power-saving operation mode, or the third power-saving operation mode is performed according to the amount of time elapsed since an end of the image forming operation performed by the image forming unit.

5. The image forming apparatus according to claim 3, wherein switching into the first power-saving operation mode, the second power-saving operation mode, or the third power-saving operation mode is performed in accordance with a command from an external device.

6. The image forming apparatus according to claim 3, wherein in response to a mode switch command transmitted from the second control unit, the first control unit switches the operation mode into one of the first power-saving operation mode, the second power-saving operation mode, and the third power-saving operation mode.

7. The image forming apparatus according to claim 2, wherein the image forming unit includes a fixing unit configured to fix an image on a recording medium, and wherein in the first power-saving operation mode or the third power-saving operation mode, the operation of the first control unit is stopped whereby supplying of electric power to the fixing unit is stopped.

8. The image forming apparatus according to claim 1, wherein when the image forming apparatus is in the first power-saving operation mode, the first control unit switches a following process in accordance with a signal from the power supply unit or a signal from the state detection unit.

9. The image forming apparatus according to claim 8, wherein the state detection unit is a sensor configured to detect a state of a door disposed on the image forming apparatus in terms of whether the door is in an open state or a closed state, and the power supply unit is a switch configured to supply electric power, and wherein in a case where the first control unit detects a signal from the sensor, the first control unit performs a process of determining whether a consumable member detachable from the image forming apparatus or attachable to the image forming apparatus has been exchanged while in a case where the first control unit detects a signal from the switch, the first control unit does not perform a following process.

10. The image forming apparatus according to claim 6, wherein power consumption of the image forming apparatus is larger in the first power-saving operation than in the second power-saving operation, and wherein power consumption of the image forming apparatus is larger in the second power-saving operation than in the third power-saving operation.

11. The image forming apparatus according to claim 1, wherein oscillation of the first control unit is stopped in the first power-saving operation mode, and oscillation of the second control unit is stopped in the second power-saving operation mode.

12. An image forming apparatus comprising:

a first control unit configured to control an operation of an image forming unit; and a second control unit configured to transmit information for forming an image to the first control unit, the image forming apparatus having a normal operation mode in which an image forming operation is performed, a first power-saving operation mode in which an operation of the first control unit is stopped, and a second power-saving operation mode in which supplying of electric power to the second control unit is stopped, the image forming apparatus further comprising:

a power supply unit configured to supply electric power to the image forming apparatus; and a state detection unit configured to detect a state of the image forming unit, the second control unit being configured such that when the image forming apparatus is in the first power-saving operation mode, the second control unit determines whether the image forming apparatus is to switch into the normal operation mode from the first power-saving operation mode in response to a signal from the power supply unit, a signal from the state detection unit, or a return signal from the second control unit, the first control unit being configured such that when the image forming apparatus is in the second power-saving operation mode, the first control unit determines whether the image forming apparatus is to switch into the normal operation mode from the second power-saving operation mode in response to the signal from the power supply unit or the signal from the state detection unit.

13. The image forming apparatus according to claim 12, further comprising a connection detection unit configured to detect whether an external device is connected to the image forming apparatus, the first control unit being configured such that when the image forming apparatus is in the second power-saving operation mode, the first control unit determines whether the image forming apparatus is to switch into the normal operation mode or the first power-saving operation mode from the second power-saving operation mode in response to a signal from the connection detection unit.

14. The image forming apparatus according to claim 13, the image forming apparatus further having a third power-saving operation mode in which an operation of the first control unit is stopped and supplying of electric power to the second control unit is stopped, wherein when the image forming apparatus is in the third power-saving operation mode, the second control unit switches into the normal operation mode in response to a signal from the power supply unit, and wherein when the image forming apparatus is in the third power-saving operation mode, the second control unit switches into the normal operation mode, the first power-saving operation mode, or the second power-saving operation mode in response to a signal from the connection detection unit.

15. The image forming apparatus according to claim 12, wherein the second control unit changes from the first power-saving operation mode to the normal operation mode in a case where the second control unit receives a signal from the power supply unit or a signal from the first control unit in the first power-saving operation mode, and the second control unit maintains the first power-saving operation in a case where the second control unit receives a signal from the state detection unit in the first power-saving operation mode.

16. The image forming apparatus according to claim 12, wherein the first control unit changes from the second power-saving mode to the normal operation mode in response to a signal from the power supply unit, and the first control unit maintains the second power-saving operation in response to a signal from the state detection unit.

17. The image forming apparatus according to claim 12, wherein power consumption of the image forming apparatus is larger in the first power-saving operation than in the second power-saving operation.

18. The image forming apparatus according to claim 12, wherein oscillation of the first control unit is stopped in the first power-saving operation mode, and oscillation of the second control unit is stopped in the second power-saving operation mode.

19. An image forming apparatus comprising:

a first control unit configured to control an operation of an image forming unit; and a second control unit configured to transmit an instruction signal to the first control unit, wherein the image forming apparatus sets a first power-saving state and a second power saving state in which power consumption of the image forming apparatus is smaller than the first power-saving state and a third power-saving state in which the power consumption is smaller than the second power saving state selectively, wherein the first power-saving state is a state that electric power is supplied to both the first control unit and the second control unit and an operation of the first control unit is stopped, and the second power-saving state is a state that electric power is supplied to the first control unit and electric power is not supplied to the second control unit, and third power-saving state is a state that electric power is supplied to the first control unit, electric power is not supplied to the second control unit and the first control unit is stopped.

20. The image forming apparatus according to claim 19, wherein the first control unit is capable of detecting a change of a state of the image forming apparatus in the first power-saving state, and wherein the first control unit stops supplying electric power to the second control unit in the second power-saving state.

21. The image forming apparatus according to claim 19, wherein the image forming apparatus changes the first power-saving state to a normal operation state in which the image forming unit forms an image according to the instruction signal from the second control unit.

22. The image forming apparatus according to claim 19, wherein oscillation of the first control unit is stopped in the first power-saving state and in the third power-saving state, and wherein oscillation of the first control unit is continued in the second power-saving mode.

* * * * *